(No Model.) 3 Sheets—Sheet 1.
C. E. SACKETT.
MACHINE FOR OPENING SKINS.
No. 589,444. Patented Sept. 7, 1897.
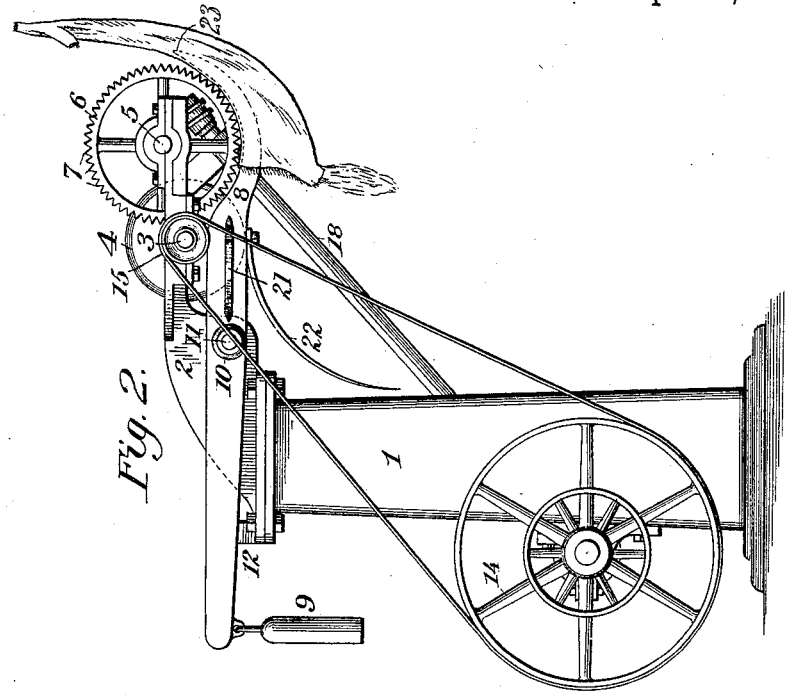
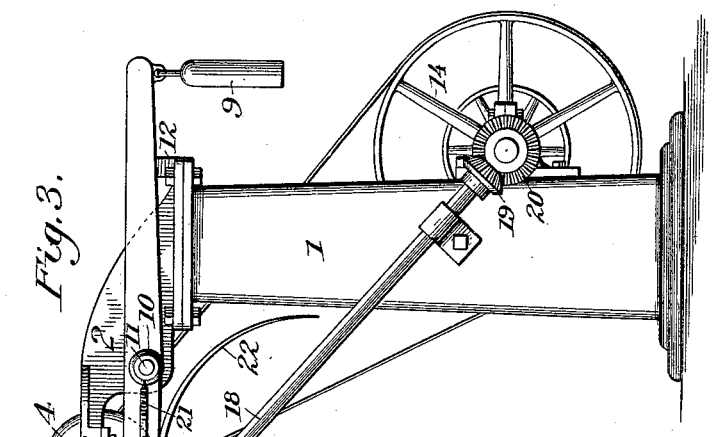
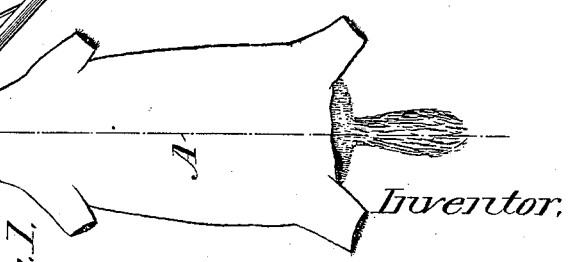
Witnesses,
Louis Gagnon
William Ogden
Inventor,
Chas E Sackett (No Model.)   3 Sheets—Sheet 2.

C. E. SACKETT.
MACHINE FOR OPENING SKINS.

No. 589,444. Patented Sept. 7, 1897.

Witnesses.
Louis Gagnow
William Ogden

Inventor.
Chas E Sackett (No Model.)  3 Sheets—Sheet 3.

C. E. SACKETT.
MACHINE FOR OPENING SKINS.

No. 589,444. Patented Sept. 7, 1897.

WITNESSES:  
Ralph Goebel  
Wm Ogden

INVENTOR  
Chas. E. Sackett

UNITED STATES PATENT OFFICE.

CHARLES E. SACKETT, OF DANBURY, CONNECTICUT.

MACHINE FOR OPENING SKINS.

SPECIFICATION forming part of Letters Patent No. 589,444, dated September 7, 1897.

Application filed November 16, 1896. Serial No. 612,283. (No model.)

*To all whom it may concern:*

Be it known that I, CHARLES E. SACKETT, a citizen of the United States, residing at Danbury, in the county of Fairfield and State of Connecticut, have invented a new and useful Improvement in Machines for Opening Cased Skins, of which the following is a full, clear, and exact description.

The object of my invention is to provide a new and useful method of opening cased skins, principally those of the cony and hare, which are used in very large numbers in the manufacture of hatters' furs. These skins are stripped from the animals with the fur turned inside and are dried in that state and packed flat in bales. They require to be split up one side before the fur can be operated upon for dressing or cutting. The operation of opening them has been and still is largely performed by hand by drawing them down over a slotted horn and slitting the skin with a hand-knife. Machines have been patented for this purpose having a cutting device driven by power, but the skins still have to be drawn down over the horn by hand until they come in contact with the cutting device and then drawn across the cutting device throughout the entire length of the skin by hand.

My invention aims to provide an automatic feeding device that will guide and carry the skin up to the cutting device and continue to feed the skin automatically to the cutter throughout its length independent of the operator, who can then be picking up another skin to enter the feed, thus making the operation continuous and slitting many more skins per day than can be done by any device now in use.

In the accompanying drawings like figures relate to like parts.

Figure 4:
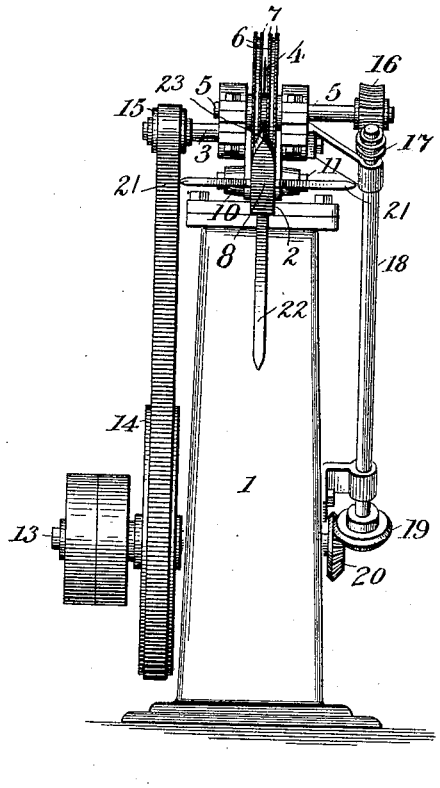
Figure 5:
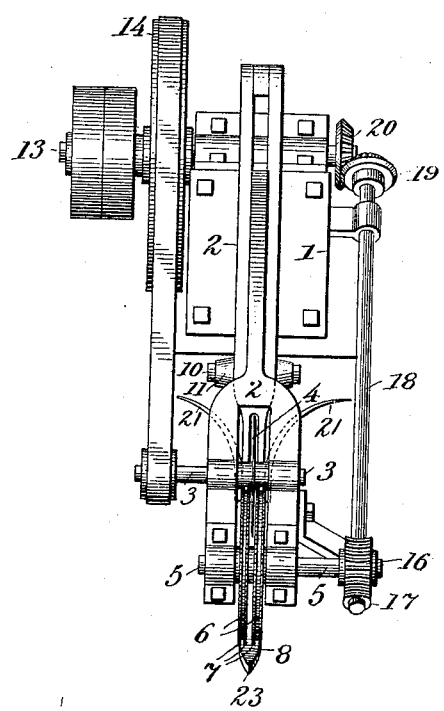
Figure 6:
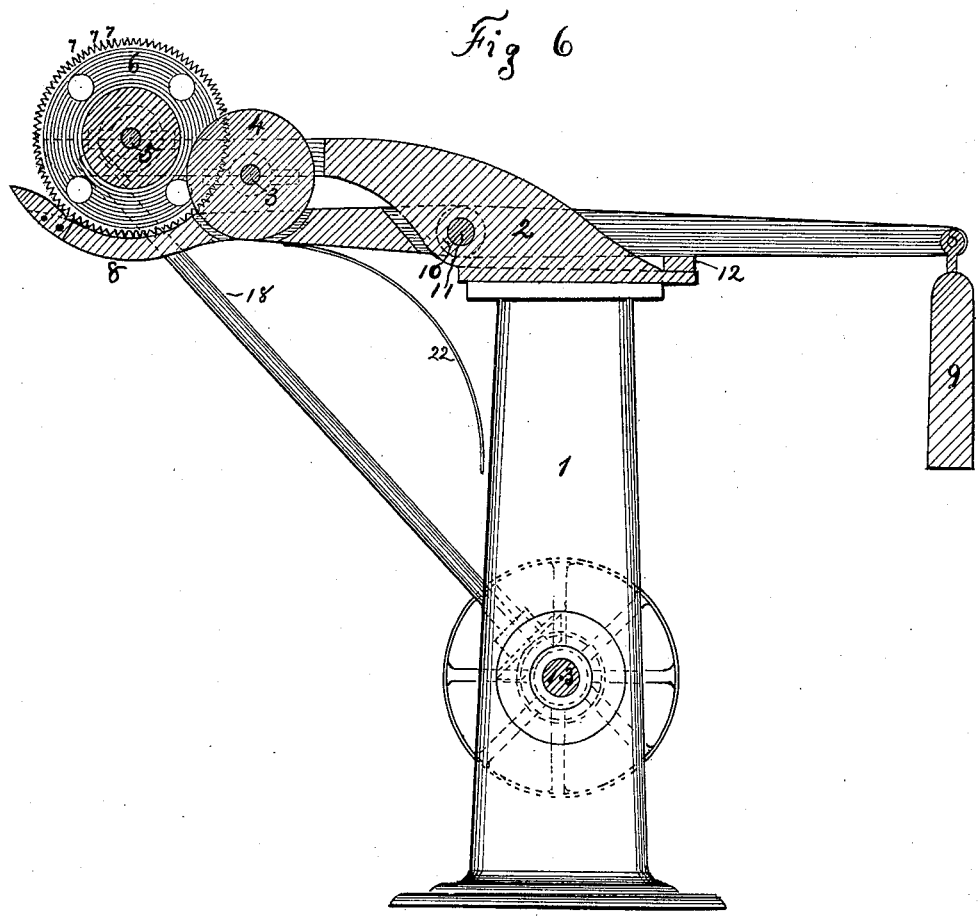

Figure 1 is a view of a cased pelt which is to be slit open on line A. Fig. 2 is a side elevation of the machine in the act of slitting a pelt. Fig. 3 is a reverse side elevation. Fig. 4 is a front elevation. Fig. 5 is a plan view. Fig. 6 is a sectional view.

1 is a standard of any suitable shape, on the top of which is bolted a plate 2, having bearings 3 3, in which is journaled a circular cutting-knife 4 and bearings 5 5, in which is journaled a feeding-wheel 6, consisting of an ordinary spoked wheel having points 7 7 7 set in its periphery, which engage with the pelt, as shown in Fig. 2. The feed-wheel is recessed vertically to allow the cutter 4 to penetrate some distance into it. A vibrating shell-plate 8 surrounds the lower part of this wheel, which in a state of rest fits accurately up to its projecting points. This plate is also pierced by the circular cutter 4, which operates through it and the feed-wheel, as shown in Figs. 1 and 2. Beyond the feed-wheel it spreads around the plate 2 to form a lever, having a weight 9 hung at its extremity. This lever is pivoted through the bearings 10 10 to the plate 2, which is practically a part of the standard, by the pivot 11, which forms the fulcrum of the lever and about which it vibrates. The weight holds the lever carrying the shell at its other extremity firmly up against the points of the feed-wheel, but to prevent any grinding action between the points and the shell when skins are not being fed the lever near the weight extremity rests upon a block 12, which is adjusted to just let the points of the feed-wheel touch the shell without pressure. It is apparent then that the insertion of any substance between them will create pressure and be carried forward by the natural action of the wheel, and that the vibrating shell-lever will accommodate itself to any thicknesses of pelts that may be inserted.

The circular cutter-knife 4 is driven from the counter-shaft 13 by the driving-pulley 14, belted to the pulley 15 on the end of the knife-axle. The feed-wheel 6 is driven by a worm-wheel 16 on the end of its axle, which is operated by a worm 17 and shaft 18, geared to the counter-shaft by bevel-gears 19 and 20, as shown.

The operation of the machine is simple. A skin is inserted over the end of the shell far enough for the points of the feed-wheel to engage it and then left to take care of itself. As the fur side is turned in it slips freely over the shell. The weighted lever holds it firmly up against the feed-wheel, which carries it forward against the cutter-knife, which is revolved at high velocity. The slitting of the skin takes place as it is urged forward by the wheel, and as it parts it is diverted sidewise and downward by the side feathers 21 21 and the bottom feather 22, which open the skin out flat and drop it to the floor or into any convenient receptacle. Some skins come with the usual holes in the top completely closed, and in order that these shall not become an obstruction I provide the end of the shell-lever with a sharp pointed and edged cutting-blade 23, having the shape of an arrow-head, which pierces and opens the end of a closed skin when drawn forward against the cutting edges by the feed-wheel, thus allowing it to continue its course over the shell.

It is obvious that various styles of feed-wheels may be devised and various styles of lever-bars used to press against that wheel. The object of using a shell shape is only that the wheel may grip the skin at more points than one. Equally a spring may be used instead of a weight to exert the necessary pressure at the other end of the lever and straight instead of circular cutters adopted.

I claim—

1. In a machine for opening skins, the combination with a cutting device of an automatic feeding device consisting of a wheel having projections around its periphery, and a shell fitting partially around the circumference of said projections, said shell being constructed to exert an elastic pressure against the projections of said wheel for the purposes set forth and substantially as described and shown.

2. In a machine for opening skins the combination with a cutting device of a lever having at one end a bearing against a feeding-wheel, a fulcrum, and at the other end a device for creating an elastic pressure between the bearing end of the lever and the peripheral extremities of the feeding-wheel, for the purpose set forth and substantially as described and shown.

3. In a machine for opening skins the combination with a cutting device of a feeding-wheel to automatically feed the skins, a bar bearing against the wheel, and at the end of the bar upon which the skin is entered a pointed device for piercing said skins, substantially as described and shown.

4. In a machine for opening skins the combination with a cutting device, a feeding-wheel and a bar bearing against the periphery of said wheel, of side and bottom guide-plates 21 21 22 placed along the line of said bar for the purpose of diverting the skins after being cut into any convenient receptacle, substantially as described and shown.

CHARLES E. SACKETT.

Witnesses:
BRONSON S. BURR,
F. F. WHEELER.